Feb. 6, 1962 A. G. RICHARDSON 3,020,358

MAGNETIC RECORDING AND REPRODUCING APPARATUS

Filed Feb. 6, 1957

Inventor
AVERY G. RICHARDSON
By [signature]
Attorney

United States Patent Office 3,020,358

Patented Feb. 6, 1962

3,020,358 MAGNETIC RECORDING AND REPRODUCING APPARATUS

Avery G. Richardson, Boonton, N.J., assignor to International Telephone and Telegraph Corporation, Nutley, N.J., a corporation of Maryland Filed Feb. 6, 1957, Ser. No. 638,891
9 Claims. (Cl. 179—100.2)

This invention relates to magnetic recording and reproducing apparatus and more particularly to devices which record at one speed and reproduce at another speed.

A serious radio communication problem is that of obtaining negligible interference between a number of simultaneous operating channels for use in specific frequency bands where the traffic load is very heavy. One suggested method is that of time sharing in place of radio frequency channeling and is based upon breaking each speech signal into successive trains of one second duration, time compressing each such train into a speech signal burst of 10 milliseconds duration and then transmitting 100 such bursts successively in each second in order to multiplex 100 speech channels into one radio frequency carrier. This requires that some suitable form of memory storage be employed to store the recorded signals until they are reproduced and transmitted. A relatively inexpensive form of storage device is magnetic tape or other form of magnetic surface which is movable and can be constantly used and re-used, as where the information is recorded, reproduced and then erased to allow the process to be repeated for successive increments of information. It is clear that two speeds are required, a slow speed for recording, and a faster speed for reproducing. Machines have been devised which use this principle of recording at one speed and reproducing the information at another speed, but they are complex and expensive. It has also been necessary to devise complicated and intricate means of rotating the reproducing head and the recording head in such positions that one will not interfere with the operation of the other.

It is therefore an object of this invention to provide a magnetic recording and reproducing system which records a continuous stream of signals and reproduces these signals in short bunches in which the original frequencies have been multiplied by some known amount.

A feature of this invention is that the recording head may record over the entire width of the magnetizable surface and the reproducing head scans separately certain portions only of said surface.

Another feature of this invention is the offset of the center of rotation of the reproducing head from the center of rotation of the recording head to permit continuous rotation of both the recording head and the reproducing head.

Still another feature of this invention is the oscillation of the recording head through an arc so that the angle made by the air gap between the pole pieces of the recording head with respect to the direction of rotation of the magnetizable surface, coincides with the angle made by the air gap between the pole pieces of the reproducing head with respect to the direction of rotation of the magnetizable surface at the time of reading.

A further feature of this invention is the use of a signal gate coupled to the output of the reproducing head and the means synchronized to the rotation of the reproducing head to cause the gate to open for conduction of signals reproduced from the magnetized surface.

The above-mentioned and other features and objects of this invention will become more apparent by reference to the following description taken in conjunction with the accompanying drawings, in which.

Figure 1:
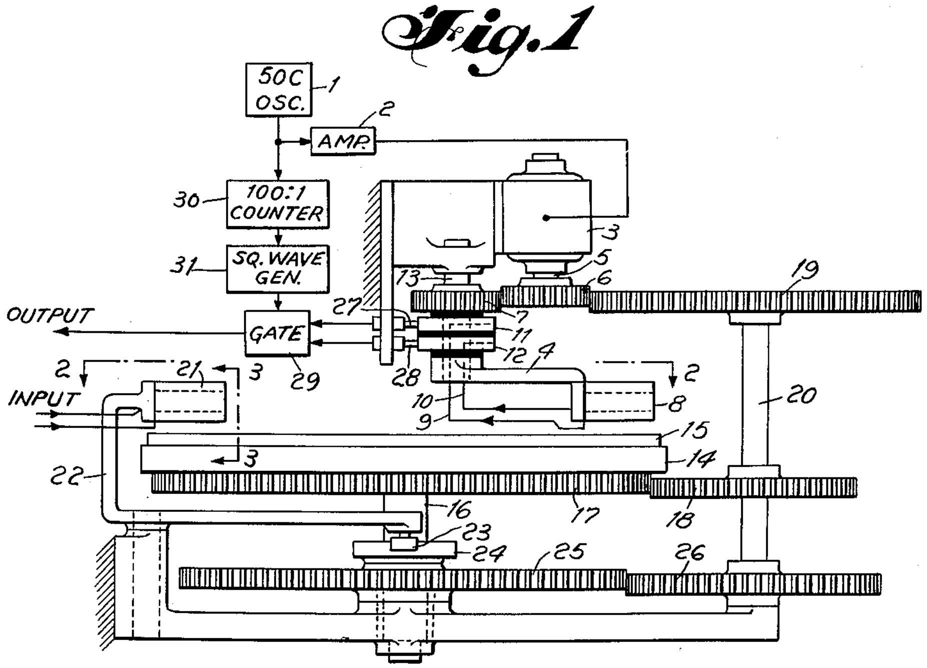
FIG. 1 is an elevation view of the recording and reproducing apparatus with the circuit elements being indicated diagrammatically.

With reference to FIG. 1, there is shown a 50 cps. oscillator 1 whose output is amplified by amplifier 2 and used to energize a motor 3. A reproducing arm 4 is coupled to the drive shaft 5 of the motor 3 by means of gears 6 and 7 and the shaft 13. If desired, reproducing arm 4 may be directly coupled to the drive shaft 5 or may be coupled thereto by any suitable mechanical means as gearing or pulleys depending on the speed ratio desired and the direction of rotation of the reproducing arm. Fastened to the end of the reproducing arm 4 is a reproducing head 8, whose output leads 9 and 10 are coupled to slip rings 11 and 12 on the shaft 13. Disc 14 carries a magnetizable surface 15 and is rotated by means of shaft 16 which is coupled to drive shaft 5 by a gear train consisting of gears 17, 18, 19 and 6. Gears 18 and 19 are secured to shaft 20. The axis of shaft 16 is offset from the axis of shaft 13 so that the reproducing head 8 can rotate continuously without interfering with the recording head 21 which is fastened to one end of a U-shaped arm 22. The reproducing head 8 is shown the same width as the recording head 21, but it may be made narrower, if desired, and to reduce noise pickup. The recording head 21 is oscillated through an arc over the magnetizable surface 15 by means of the cam follower 23 which is secured to the other end of the cam 22 and actuated by the cam 24. Cam 24 is rotated by means of a gear train consisting of gears 25, 26, 19 and 6. Cam 24 is fastened to gear 25 which is independently rotatable about shaft 16. Cam 24 can rotate at a different speed from disc 14 depending on the respective gear ratios of gears 17 and 18 and 25 and 26. Collector brushes 27 and 28 contact slip rings 11 and 12, respectively, and their output is coupled to gate 29. The output of oscillator 1 is coupled to amplifier 2 and a counter 30 of the type, for example, as described in "Pulse and Digital Circuits" by Jacob Millman and Herbert Taub, published by McGraw Hill Book Company, Inc., at pages 323–353. A square wave generator 31 couples the output of counter 30 to gate 29.

Figures 2, 3:
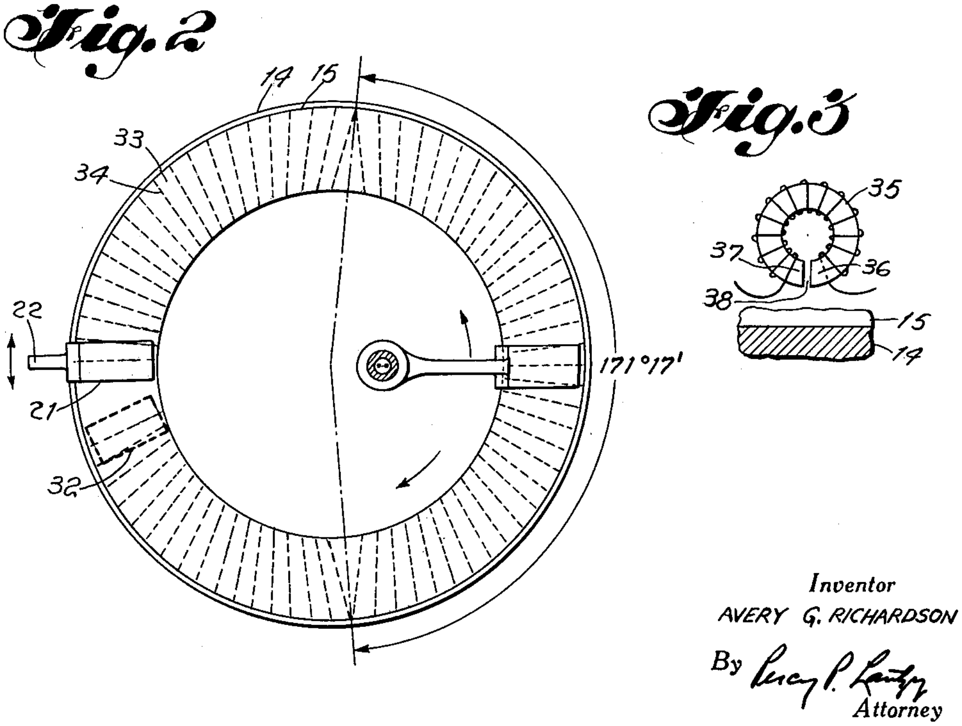
FIG. 2 is a top plan view of the apparatus along the line 2—2 of FIG. 1.
FIG. 3 shows a ring-head type of recording head or reproducing head in relation to the magnetizable surface as viewed along line 3—3 of FIG. 1.

Referring to FIG. 2, there is shown a top view of disc 14 with an erase head 32 and a recorded track 33 as produced by the oscillation of the recording head 21 on the magnetizable surface 15. The radially unsymmetrical lines 34 are shown to illustrate how information is laid down on the surface 15 by the oscillation of the recording head 21 as the disc 14 rotates, so that the resulting magnetism is in the proper position to be read off by the reproducing head 8 as it rotates about its axis. Because of the offset of the center of rotation of the reproducing head 8 from the center of rotation of the disc 14, the reproducing head 8 scans only a portion of the recorded track 33 and will read off the recorded information on direction lines radial to the center of rotation of the reproducing head 8 which are the lines 34. These radial lines will not be radial to the center of rotation of disc 14. If the recording head 21 were fixed and not oscillating, it would record direction lines of information that would be radial to the center of rotation of disc 14 but would not be radial to the center of rotation of the reproducing head 8.

FIG. 3 illustrates a ring head 35 suitable for use as a recording head or a reproducing head, in relation to the rotating disc 14. The poles of this ring head 35 are 36 and 37 and they are spaced apart to form the air gap 38. The angle made by the air gap 38 in the recording head 21 with respect to the direction of motion of disc 14 must be substantially the same as the angle made by the air gap 38 of the reproducing head 8 with the same direction of motion of the disc 14. If the angles are different, then the high frequency response will suffer and distortion will result. If the distortion is tolerable, there need be no correction for the angular deviation; but if this distortion cannot be tolerated, then the angular deviation must be corrected. This is achieved by oscillating the recording head 21 about an angle of approximately ±5 degrees from the mean position of the recording head 21.

Oscillator 1 is a highly stabilized 50-cycle per second oscillator whose output is amplified by amplifier 2 and is used to energize the motor 3. The motor drive shaft 5 speed is also the speed of the reproducing head 8 in the embodiment of this invention. Gears 6 and 7 are in the ratio of 1:1. This permits the reproducing head 8 to rotate in a direction opposite to the direction of rotation of the disc 14. Thus when the electronic switch of gate 29 is opened at the proper time the reproducing head 8 scans the magnetizable surface 15 from the beginning to the end of the one second recorded information. Suppose we want to reproduce one second of recorded information in $\frac{1}{100}$ of a second. The reproducing head 8 rotates one-half revolution in $\frac{1}{100}$ of a second. The portion of surface 15 scanned by the reproducing head 8 is less than 180 degrees due to the offset of the respective centers of rotation of the reproducing head 8 and the disc 14 and is actually 171°17′ degrees when the proper amount of offset is used. Therefore, the disc 14 must rotate 171°17′ degrees in one second. To attain this speed, the step-down gear ratio from the drive shaft 5 must be 105:1. To maintain the correct alignment of the air gap in the recording head 21 and reproducing head 8, the cam 24 must be designed to oscillate the recording head 21 ±5 degrees in one second. This condition requires that the step-down gear ratio to drive the cam shaft be 100:1 or 180 degrees rotation of the cam shaft every second.

There must be means to synchronize the rotation of the reproducing head 8 with the rotation of the disc 11. The output of the oscillator 1 is fed into the 100/1 counter 30 which is then coupled to the square wave generator 31 to obtain as the output of the generator 31 one square wave pulse every second, the duration of said pulse being 10 milliseconds. This 10-millisecond pulse is fed into the gate 29 and opens the electronic switch to permit conduction through the gate of the reproduced signals during one-half rotation of the reproducing head 8.

It is to be understood that the speed of the motor drive shaft 5, the reproducing head 8 and the disc 14, as well as the oscillatory travel of the recording head 21 and the motion of the cam 24, are given by way of example only and do not constitute any limitations of this invention.

It is also to be understood that the magnetizable surface may be other than a flat disc and may be spherical or cylindrical if desired. Although I have described the principles of my invention in relation to an apparatus wherein the recording is made at a slow speed and the reproduction thereof is effected at a faster speed, it should be understood that the reverse can be done so that the recording may be made at a faster rate and the reproducing at the slow rate.

While I have described above the principles of my invention in connection with specific apparatus, it is to be clearly understood that this description is made only by way of example and not as a limitation to the scope of my invention as set forth in the objects thereof and in the accompanying claims.

I claim:

1. An apparatus for magnetically recording and reproducing signals comprising a drive shaft, a reproducing head, means coupling said reproducing head to said shaft for rotation about said shaft, rotatable means carrying a layer of magnetizable material, the thickness thereof being small compared to its width, means coupling said shaft to said rotatable means for rotation of said layer of magnetizable material about said shaft, a recording head disposed for recording signals on said layer, said recording head being adapted to magnetize said layer along a circular track, the center of rotation of said reproducing head being offset with respect to the center of rotation of said magnetizable layer so that an arcuate portion of the path of said reproducing head coincides with an arcuate portion of said track.

2. An apparatus for magnetically recording and reproducing signals comprising a drive shaft, a reproducing head, means coupling said reproducing head to said shaft for rotation about said shaft, rotatable means carrying a layer of magnetizable material, the thickness thereof being small compared to its width, means coupling said shaft to said rotatable means for rotation of said layer of magnetizable material about said shaft, a recording head disposed for recording signals on said layer, said recording head being adapted to magnetize said layer along a circular track, the center of rotation of said reproducing head being offset with respect to the center of rotation of said magnetizable layer so that an arcuate portion of the path of said reproducing head coincides with an arcuate portion of said track, and means synchronized with the rotation of said reproducing head to oscillate said recording head through a given arc to record information in a mangetic direction which is in substantial alignment with the magnetic pickup of said reproducing head during its scanning of said track.

3. An apparatus for magnetically recording and reproducing signals comprising a drive shaft adapted to be driven at a given rate of speed, a reproducing head, means coupling said reproducing head to said shaft for rotation about said shaft, rotatable means carrying a layer of magnetizable material, the thickness thereof being small compared to its width, means coupling said shaft to said rotatable means for rotation of said layer of magnetizable material about said shaft, a recording head disposed for recording signals on said layer, said recording head being adapted to magnetize said layer along a circular track, the center of rotation of said reproducing head being offset with respect to the center of rotation of said magnetizable layer so that an arcuate portion of the path of said reproducing head coincides with an arcuate portion of said track, a signal gate coupled to the output of said reproducing head and means synchronized to the rotation of said reproducing head to cause said gate to open for conduction of signals reproduced from said track.

4. An apparatus for magnetically recording and reproducing signals comprising rotatable means carrying a layer of magnetizable material, the thickness thereof being small compared to its width, a recording head, means disposing said recording head adjacent said layer to magnetize said layer along a circular track of given diameter, a reproducing head, and means to rotate said reproducing head along a circular path having a diameter different from said given diameter but so disposed that an arc of said path coincides with an arc of said track.

5. An apparatus according to claim 4, wherein said recording head is of a length greater than the length of said reproducing head whereby the magnetized track is of a width greater than the length of said reproducing head.

6. An apparatus for magnetically recording and reproducing signals comprising rotatable means carrying a layer of magnetizable material, the thickness thereof being small compared to its width, a recording head, means disposing said recording head adjacent said layer to magnetize said layer along a circular track of given diameter and width, a reproducing head, means to rotate said reproducing head along a circular path having a diameter different from said given diameter but so disposed that an arc of said path coincides with an arc of said track, and means synchronized with the rotation of said reproducing head to oscillate said recording head through a given arc to record information in a magnetic direction which is in substantial alignment with the magnetic pickup of said reproducing head during its scanning of said track.

7. An apparatus for magnetically recording and reproducing signals comprising rotatable means carrying a layer of magnetizable material, the thickness thereof being small compared to its width, a recording head, means disposing said recording head adjacent said layer to magnetize said layer along a circular track of given diameter and width, a reproducing head, means to rotate said reproducing head along a circular path having a diameter different from said given diameter but so disposed that an arc of said path coincides with an arc of said track, a signal gate coupled to the output of said reproducing head and means synchronized to the rotation of said reproducing head to cause said gate to open for conduction of signals reproduced from said track.

8. An apparatus for magnetizably recording and reproducing signals comprising a drive shaft adapted to be driven at a given rate of speed, a reproducing head, means coupling said reproducing head to said shaft for rotation at a first speed about said shaft, rotatable means carrying a layer of magnetizable material, the thickness thereof being small compared to its width, means coupling said shaft to said rotatable means for rotation at a second speed, a recording head disposed for recording signals on said surface, said recording head being adapted to magnetize said layer along a circular track, the center of rotation of said reproducing head being offset with respect to the center of rotation of said magnetizable layer so that an arcuate portion of the path of said reproducing head coincides with an arcuate portion of said track, said first speed of rotation being greater than said second speed of rotation, means synchronized with the rotation of said reproducing head to oscillate said recording head through a given arc to record information in a magnetic direction which is in substantial alignment with the magnetic pickup of said reproducing head during its scanning of said track, a signal gate coupled to the output of said reproducing head, and means synchronized to the rotation of said reproducing head to cause said gate to open for conduction of signals reproduced from said track.

9. An apparatus for magnetically recording and reproducing signals comprising rotatable means carrying a layer of magnetizable material, the thickness thereof being small compared to its width, a reproducing head, means to rotate said reproducing head along a circular path, a recording head and means disposing said recording head to magnetize said layer along a track having at least two curved portions, each of said portions being symmetrical with respect to the other, said curved portions being coincident with a portion of said path at different instances of time in the rotation of said layer.

No references cited.